Nov. 2, 1926.
C. R. SHORT
1,605,562
CLUTCH
Filed Nov. 23, 1923 2 Sheets-Sheet 1
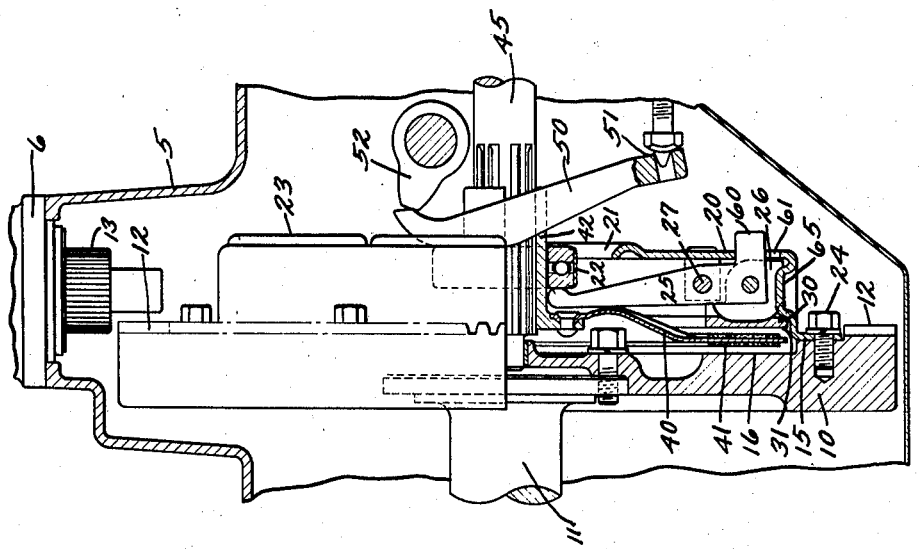
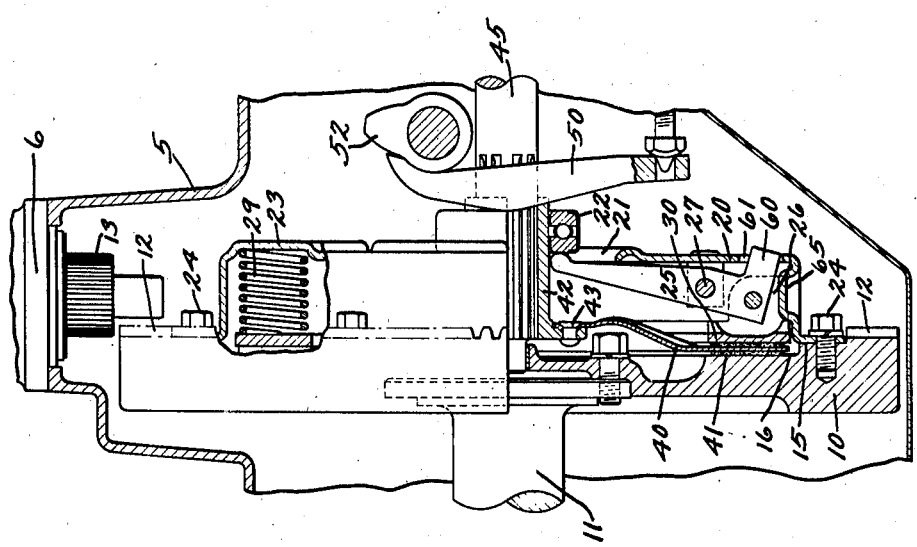
Inventor
Charles R. Short
By Spencer, Duvall, T. Hardman.
His Attorneys Nov. 2, 1926.
C. R. SHORT
1,605,562
CLUTCH
Filed Nov. 23, 1923
2 Sheets-Sheet 2
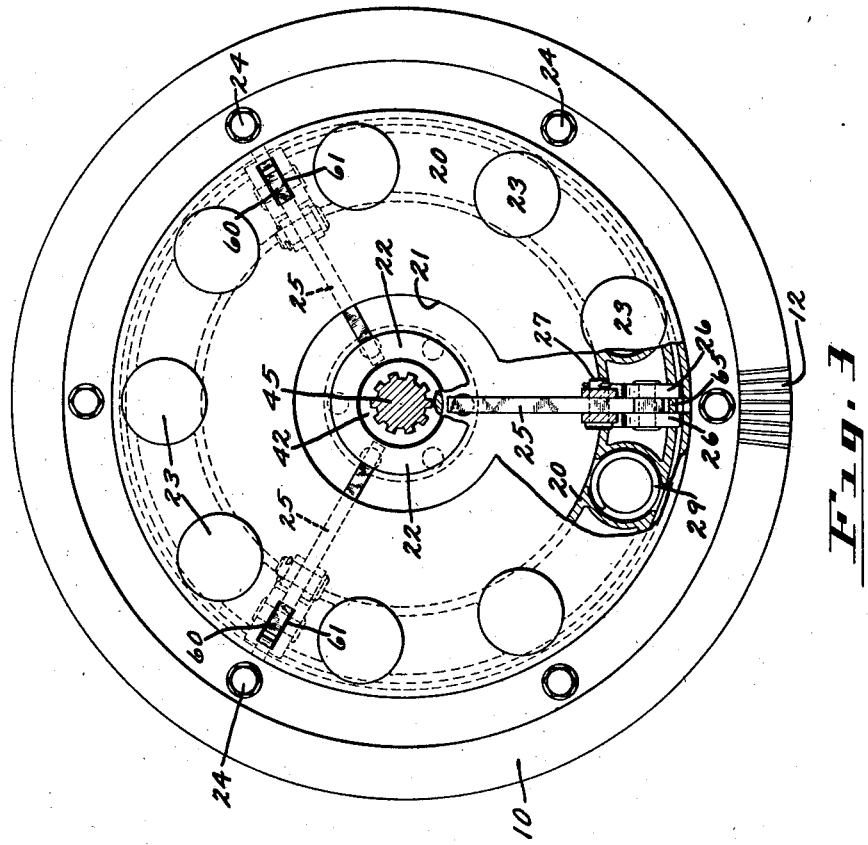
Inventor
Charles R. Short
By Spencer, Sewall, & Hardman.
His Attorneys Patented Nov. 2, 1926.

1,605,562

UNITED STATES PATENT OFFICE.

CHARLES R. SHORT, OF DAYTON, OHIO, ASSIGNOR TO GENERAL MOTORS RESEARCH CORPORATION, OF DAYTON, OHIO, A CORPORATION OF DELAWARE.

CLUTCH.

Application filed November 23, 1923. Serial No. 676,644.

The present invention relates to single plate clutches for automobiles or other power driven vehicles.

Among the objects is to increase the efficiency and economy of such devices by decreasing the number of parts and wearing surfaces and simplifying the construction and operation.

Further objects and advantages of the present invention will be apparent from the following description, reference being had to the accompanying drawings, wherein a preferred form of embodiment of the present invention is clearly shown.

In the drawings:

Fig. 1 shows a vertical section view through a flywheel housing and a partial vertical section through a clutch embodying the invention.

Fig. 2 shows a section similar to Fig. 1 but with the clutch in inoperative or "out" position.

Fig. 3 is an elevational view of the rear of the clutch with part of the housing removed.

In the drawings, a flywheel housing is represented at 5 and a vertically mounted starting motor at 6.

Within the housing is a flywheel 10 secured to crank shaft 11 in the usual manner and provided with gear teeth 12 cooperating with the starter pinion 13. The face of the flywheel opposite to shaft 11 is provided with two annular flat portions 15 and 16, the first of which 15 serves as a seat for the clutch housing and the second, 16, as a clutch surface.

The clutch housing 20 is in the form of a shallow flanged cup which may be of stamped sheet metal, with an opening 21 in the center for the throw out thrust bearing 22, and is also provided with pressed up portions 23, serving as seats for the clutch springs 29. The flange of housing 20 is seated upon and secured to flat portion 15 of the flywheel by bolts 24.

Mounted within and carried by housing 20 is a plurality of L-shaped throw out levers 25. These levers 25 are fulcrumed upon the housing as at 27 and at one end bear against the bearing 22. The other ends of the straight portions of levers 25 beyond fulcrums 27, that is, at the angle of the L, are pivoted between lugs 26 carried by an annular plate 30 with the base arms of the L's extending through slots 61 in housing 20. This plate 30 is flat upon the side opposite lugs 26 and forms a clutch face 31 placed opposite to the face 16 upon the flywheel. Plate 30 is also provided with seats for the clutch springs 29.

The third or driven member of the clutch is a plate 40 provided with friction material 41 upon both sides and adapted to be clamped between the faces 16 and 31. This plate 40 is secured rigidly to a flanged sleeve 42 by means of rivets 43, and is splined upon shaft 45 of the driven mechanism, which shaft and sleeve extend into the central opening 21 of housing 20. Also, loosely mounted upon the sleeve 42 is the thrust bearing 22, against the flywheel side of which press the ends of levers 25.

Against the other side of bearing 22, presses the clutch yoke 50 pivoted at 51 and operable to throw out the clutch by a cam 52 actuated in the ordinary manner by a clutch pedal (not shown).

The drive of the clutch is taken through the right angle portions 60 of levers 25 extending through the slots 61 in housing 20 and through punched up lugs 65 in the cylindrical wall of housing 20, which lugs extend inwardly between lugs 26 upon plate 30.

While the form of embodiment of the present invention as herein disclosed, constitutes a preferred form, it is to be understood that other forms might be adopted, all coming within the scope of the claims which follow.

What is claimed is as follows:

1. In a plate clutch, driving members adapted to be spring pressed together with a driven member interposed, a clutch housing enclosing said members and having movably mounted thereon one of the driving members, said housing having L-shaped throw out levers fulcrumed thereupon and pivotally connected at the angle of the L to the movably mounted member between lugs upon the latter, with one arm of the L projecting outwardly through a slot in the clutch housing.

2. In a plate clutch, driving members adapted to be spring pressed together with a driven member interposed, a clutch housing enclosing said members and having movably mounted thereon one of the driving members, said housing having L-shaped throw out levers fulcrumed thereupon and pivotally connected at the angle of the L to the movably mounted member between lugs upon the latter, with one arm of the L projecting outwardly through a slot in the clutch housing, there being also lugs upon the housing adapted to project between the lugs upon the movable driving member.

In testimony whereof I hereto affix my signature.

CHARLES R. SHORT.